United States Patent
Park

(10) Patent No.: US 11,989,089 B2
(45) Date of Patent: May 21, 2024

(54) MEMORY CONTROLLER, OPERATING METHOD THEREOF, AND COMPUTING SYSTEM INCLUDING THE SAME

(71) Applicant: SK hynix Inc., Icheon-si (KR)

(72) Inventor: Sung Jin Park, Icheon-si (KR)

(73) Assignee: SK hynix Inc., Icheon-si (KR)

(*) Notice: Subject to any disclaimer, the term of this patent is extended or adjusted under 35 U.S.C. 154(b) by 107 days.

(21) Appl. No.: 17/659,161

(22) Filed: Apr. 13, 2022

(65) Prior Publication Data

US 2023/0020521 A1  Jan. 19, 2023

(30) Foreign Application Priority Data

Jul. 19, 2021 (KR) .......................... 10-2021-0094463

(51) Int. Cl.
*G06F 11/10* (2006.01)
*G06F 12/02* (2006.01)

(52) U.S. Cl.
CPC ...... *G06F 11/1008* (2013.01); *G06F 12/0292* (2013.01); *G06F 2212/2022* (2013.01)

(58) Field of Classification Search
CPC ............. G06F 11/1008; G06F 12/0292; G06F 2212/2022
See application file for complete search history.

(56) References Cited

U.S. PATENT DOCUMENTS

| 10,078,567 B2 * | 9/2018 | Li | ........................ G06F 11/079 |
| 11,249,840 B2 * | 2/2022 | Chen | ....................... G06F 11/14 |
| 11,663,081 B2 * | 5/2023 | Park | ..................... G06F 12/0246 |
| | | | 714/747 |

FOREIGN PATENT DOCUMENTS

| KR | 10-2004-0101222 A | 12/2004 |
| KR | 10-1999288 B1 | 7/2019 |

* cited by examiner

*Primary Examiner* — Nadeem Iqbal
(74) *Attorney, Agent, or Firm* — Weaver Austin Villeneuve & Sampson LLP

(57) ABSTRACT

A memory controller includes: a map data storage for storing map data; and a read operation controller for receiving, from a host, a read request and a target logical address corresponding to the read request, acquiring a first physical address mapped to the target logical address, based on the map data, and obtaining data stored at the first physical address. When an uncorrectable error is present in the data stored at the first physical address, the read operation controller acquires a second physical address previously mapped to the target logical address before the first physical address, obtains data stored at the second physical address, and provides the host with the data stored at the second physical address and information representing occurrence of the uncorrectable error.

18 Claims, 15 Drawing Sheets

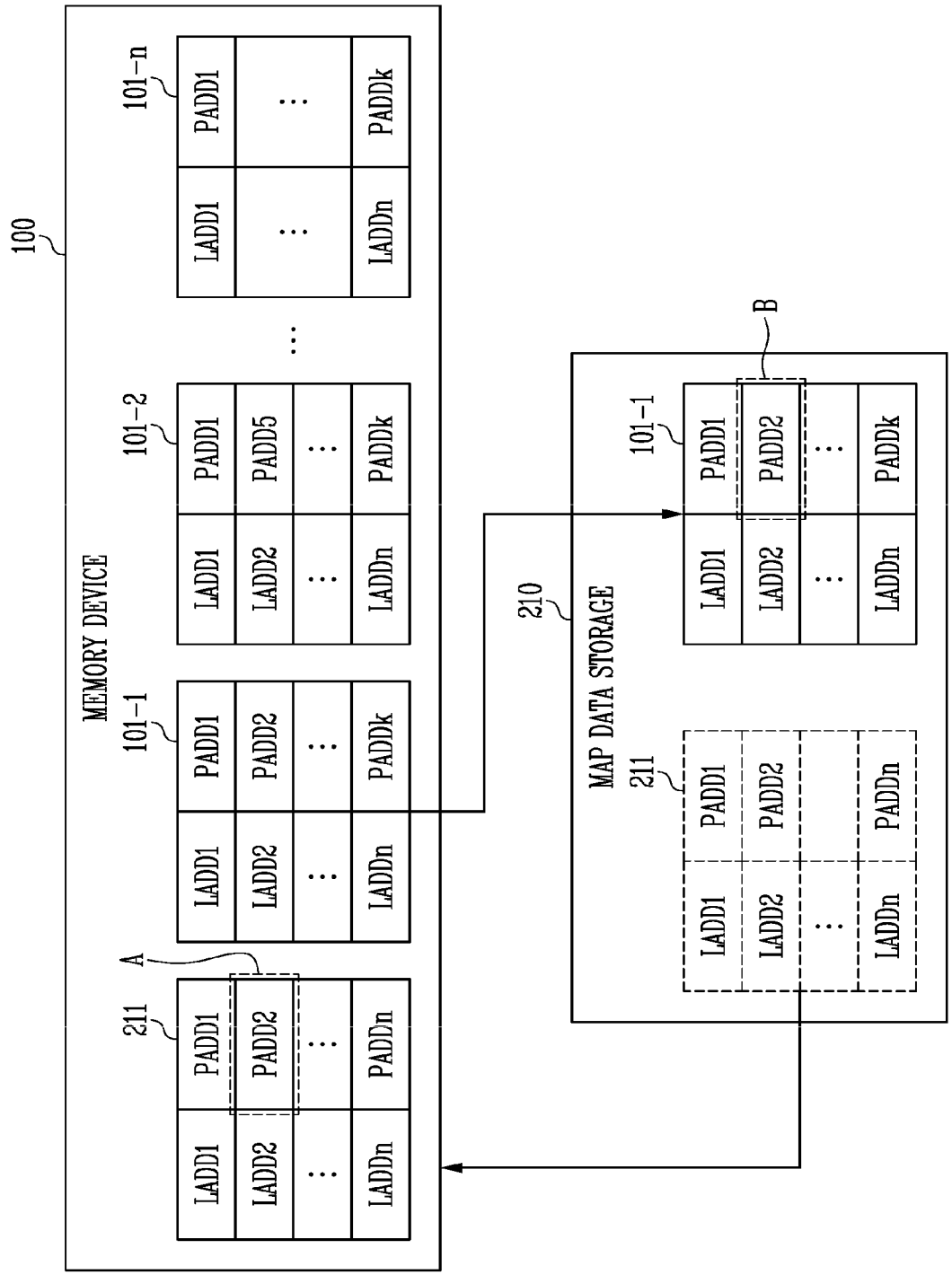

MEMORY CONTROLLER, OPERATING METHOD THEREOF, AND COMPUTING SYSTEM INCLUDING THE SAME

CROSS-REFERENCE TO RELATED APPLICATION

The present application claims priority under 35 U.S.C. § 119(a) to Korean Patent Application Number 10-2021-0094463, filed on Jul. 19, 2021, which is herein incorporated by reference in its entirety for all purposes.

BACKGROUND

1. Technical Field

The present disclosure generally relates to an electronic device, and more particularly, to a memory controller, an operating method thereof, and a computing system including the same.

2. Related Art

A storage device is a device which stores data under the control of a host device such as a computer or a smart phone. The storage device may include a memory device for storing data and a memory controller for controlling the memory device. The memory device can be classified into a volatile memory device or a nonvolatile memory device.

The volatile memory device is a memory device in which data is stored only when power is supplied, and the stored data disappears when the supply of power is interrupted. Examples of a volatile memory device may include a Static Random Access Memory (SRAM), a Dynamic Random Access Memory (DRAM), and the like.

The nonvolatile memory device is a memory device in which data does not disappear even when the supply of power is interrupted. Examples of a nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a memory controller having improved performance of a read operation, an operating method thereof, and a computing system including the same.

In accordance with an aspect of the present disclosure, there is provided a memory controller for controlling a read operation of a memory device, the memory controller including: a map data storage configured to store map data including mapping information between a logical address provided from a host and a physical address mapped to the logical address; and a read operation controller configured to receive, from the host, a read request and a target logical address corresponding to the read request, acquire a first physical address mapped to the target logical address, based on the map data, and obtain data stored at the first physical address, wherein, when the data stored at the first physical address has an uncorrectable error, the read operation controller acquires a second physical address mapped to the target logical address before the first physical address is mapped, obtains data stored at the second physical address, and provides the host with the data stored at the second physical address and information representing occurrence of the uncorrectable error.

In accordance with another aspect of the present disclosure, there is provided a computing system including: a host configured to provide a read request and a target logical address corresponding to the read request; and a storage device configured to receive the read request and the target logical address, acquire a first physical address mapped to the target logical address, determine that data stored at the first physical address has an uncorrectable error, acquire a second physical address previously mapped to the target logical address before the first physical address, and provide the host with data stored at the second physical address and information on occurrence of the uncorrectable error, wherein the host recovers data corresponding to the target logical address, based on the data stored at the second physical address.

In accordance with still another aspect of the present disclosure, there is provided a method for operating a memory controller, the method including: receiving, from a host, a read request and a target logical address corresponding to the read request; acquiring a first physical address mapped to the target logical address; receiving data stored at the first physical address from a memory device; detecting an uncorrectable error from the data stored at the first physical address; acquiring a second physical address previously mapped to the target logical address before the first physical address; receiving data stored at the second physical address from the memory device; and providing the host with the data stored at the second physical address and information representing occurrence of the uncorrectable error.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 6A and 6B are diagrams illustrating an operation of acquiring a second physical address in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
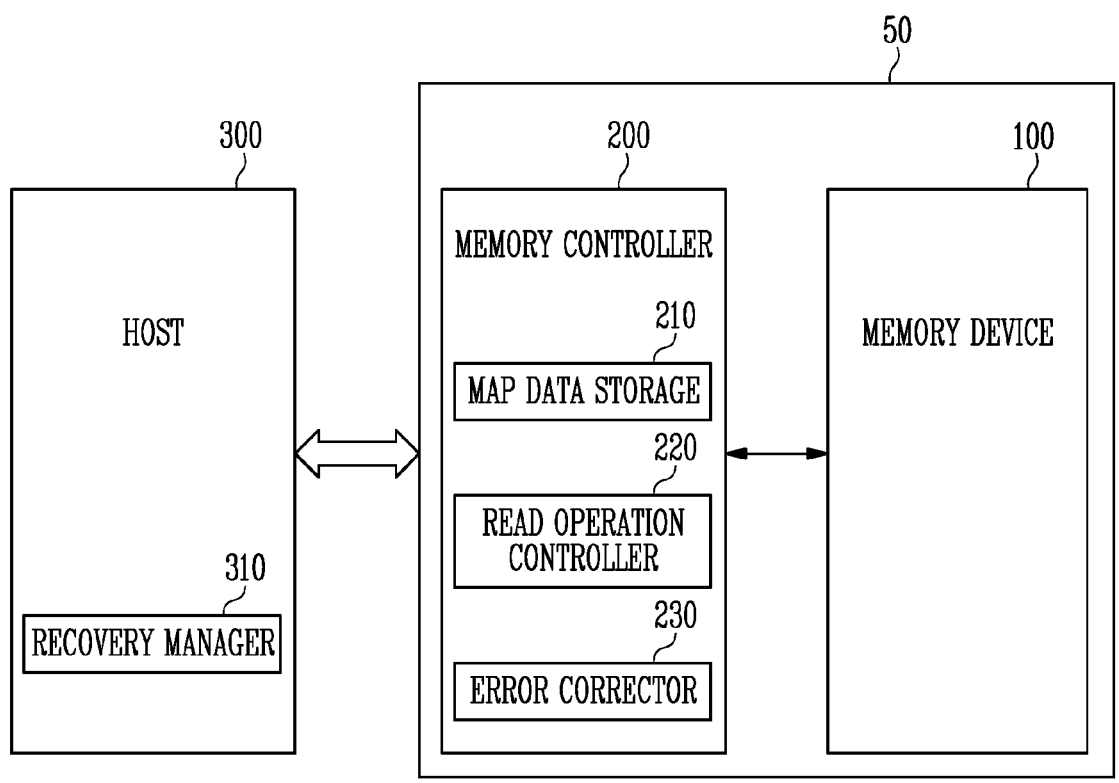
FIG. 1 is a diagram illustrating a computing system in accordance with an embodiment of the present disclosure.

FIG. 1 is a diagram illustrating a computing system 10 in accordance with an embodiment of the present disclosure.

Referring to FIG. 1, the computing system 10 may include a storage device 50 and a host 300.

The storage device 50 may include a memory device 100 and a memory controller 200 for controlling an operation of the memory device 100. The storage device 50 may be a device for storing data under the control of the host 300, such as a mobile phone, a smart phone, an MP3 player, a laptop computer, a desktop computer, a game console, a TV, a tablet PC or an in-vehicle infotainment system.

The storage device 50 may be manufactured as any one of various types of storage devices according to a host interface that provides a communication scheme to communicate with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), or a Wafer-level Stack Package (WSP).

The memory device 100 may store data. The memory device 100 may operate under the control of the memory controller 200. The memory device 100 may include a memory cell array (not shown) including a plurality of memory cells for storing data.

Each of the memory cells may be configured as any one of a Single Level Cell (SLC) storing one data bit, a Multi-Level Cell (MLC) storing two data bits, a Triple Level Cell (TLC) storing three data bits, or a Quadruple Level Cell (QLC) storing four data bits.

The memory cell array (not shown) may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 may receive a command CMD and an address ADDR from the memory controller 200, and access an area selected by the address ADDR in the memory cell array. The memory device 100 may perform an operation indicated by the command CMD on the area selected by the address ADDR. For example, the memory device 100 may perform a write operation (program operation), a read operation, and an erase operation. In the program operation, the memory device 100 may program data in the area selected by the address ADDR. In the read operation, the memory device 100 may read data from the area selected by the address ADDR. In the erase operation, the memory device 100 may erase data stored in the area selected by the address ADDR.

Meanwhile, in FIG. 1, it is illustrated that one memory device 100 is provided. However, in some embodiments, the storage device 50 may include a plurality of memory devices. A connection relationship between the plurality of memory devices and the memory controller 200 will be described with reference to FIG. 2.

The memory controller 200 may control overall operations of the storage device 50.

When power is applied to the storage device 50, the memory controller 200 may execute firmware (FW). When the memory device 100 is a flash memory device, the FW may include a host interface layer (HIL) for controlling communication with the host 300, a flash translation layer (FTL) for controlling communication between the host 300 and the memory device 100, and a flash interface layer (FIL) for controlling communication with the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. In this specification, the LBA and a "logic address" or "logical address" may be used with the same meaning. In this specification, the PBA and a "physical address" may be used with the same meaning.

The memory controller 200 may control the memory device 100 to perform a program operation, a read operation, an erase operation, or the like in response to a request from the host 300. In the program operation, the memory controller 200 may provide a write command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may be connected to the memory device 100 through a channel. For example, the memory controller 200 may control the memory device 100 to perform a program operation, a read operation, an erase operation, or the like by providing a command and an address to the memory device 100 through the channel.

In an embodiment, the memory controller 200 may autonomously generate a command, an address, and data regardless of any request from the host 300, and transmit the command, the address, and the data to the memory device 100. For example, the memory controller 200 may provide the memory device 100 with a command, an address, and data, which are used to perform read and program operations accompanied in performing wear leveling, read reclaim, garbage collection, etc.

In an embodiment, the memory controller 200 may control at least two memory devices 100. The memory controller 200 may control the memory devices according to an interleaving scheme so as to improve operational performance. The interleaving scheme may be a scheme for controlling operations on at least two memory devices 100 to overlap with each other.

In an embodiment, the memory controller 200 may include a map data storage 210, a read operation controller 220, and an error corrector 230.

The map data storage 210 may store map data. The map data may include mapping information between a logical address provided from the host 300 and a physical address mapped to the logical address.

Also, in an embodiment, the map data storage 210 may store system data. The system data may include information used to process an operation performed in the storage device 50. The system data may include map data, information associated with an address at which the map data is stored, level 0 map data, read/program/erase count data for managing the reliability and lifetime of the memory device, and the like. In an embodiment, the level 0 map data may include mapping information on top-level data among a plurality of mapping information used in the storage device 50. The top-level data may include certain data used to operate the storage device 50.

The read operation controller 220 may control a read operation of the memory device 100.

For example, the read operation controller 220 may receive, from the host 300, a read request and a target logical address corresponding to the read request.

Also, the read operation controller 220 may acquire a first physical address mapped to the target logical address, based on map data. For example, the read operation controller 220 may convert the target logical address into the first physical address by using the map data.

Also, the read operation controller 220 may generate a read command instructing the memory device 100 to read data stored at the first physical address. The read operation controller 220 may provide the memory device 100 with the first physical address and the read command. The memory device 100 may read the data stored at the first physical address in response to the read command. The memory device 100 may provide the memory controller 200 with the data stored at the first physical address.

The error corrector 230 may correct an error of data read from the memory device 100.

For example, data stored in the memory device 100 may be changed due to degradation caused by temperature, or the data read from the memory device may be changed due to read disturbance. The error corrector 230 may correct an error of data in which the error occurs.

In an embodiment, the error corrector 230 may correct an error of the data stored at the first physical address.

However, an error which is uncorrectable by the error corrector 230 may occur. When an uncorrectable error occurs, the memory controller 200 may provide the host 300 with data in which the uncorrectable error occurs, and information representing the occurrence of the uncorrectable error. When the data in which the uncorrectable error occurs includes information associated with a system file in the host 300, the error can cause the computing system 10 to not operate normally.

Thus, in accordance with an embodiment of the present disclosure, when an uncorrectable error exists in currently read data, old data corresponding to the target logical address is provided to the host 300, so that the computing system 10 can continue to operate normally even when the uncorrectable error occurs. The old data may include the same information as the read data, but has been pre-stored at a different location than that of the read data. Pre-storing of that information at a different location may occur before the read data is stored at its current location in the memory device 100. For example, when operations such as read reclaim and garbage collection are performed, the location at which data is stored can change. The old data may correspond to data which has been pre-stored in the memory device 100 before the specific data is moved to a new location according to operations such as read reclaim and garbage collection.

In an embodiment, when the error of the data stored at the first physical address is an uncorrectable error, the read operation controller 220 may acquire a second physical address mapped to the target logical address, based on one or more previous map data. The one or more previous map data may be map data stored in the memory device before the current map data is generated. In other words, the one or more previous map data may be map data before the mapping information has been updated to the current mapping information.

The second physical address may be a physical address mapped to the target logical address before the first physical address is mapped. That is, the first physical address and the second physical address are different physical addresses, but may be physical addresses mapped to the same logical address.

For example, when the error of the data stored at the first physical address is an uncorrectable error, the read operation controller 220 may control the memory device 100 to read one or more previous system data. The one or more previous system data may be previous system data stored in the memory device 100 before the current system data is generated. In other words, the one or more previous system data may be system data before being updated to the system data currently being used. Also, the one or more previous system data may include one or more previous map data.

The memory device 100 may provide the one or more previous system data to the memory controller 200. The map data storage 210 may remove system data which has been stored therein, and store the one or more previous system data provided from the memory device 100.

In an embodiment, the read operation controller 220 may detect one of the previous map data among the one or more previous map data from any one previous system data among the one or more previous system data. Also, the read operation controller 220 may acquire a physical address mapped to the target logical address from the one previous map data.

In an embodiment, the read operation controller 220 may compare the first physical address with the physical address acquired from the one previous map data. The read operation controller 220 may again acquire the physical address mapped to the target logical address or determine the physical address acquired from the one previous map data as the second physical address according to whether the first physical address and the physical address acquired from the one previous map data are the same.

In an embodiment, when the first physical address and the physical address acquired from the one previous map data are the same, the read operation controller 220 may again acquire the physical address mapped to the target logical address. For example, the read operation controller 220 may detect previous map data different from the one previous map data among the one or more previous map data from previous system data different from the one previous system data among the one or more previous system data. The different previous system data may be system data before being updated to the one previous system data. The different previous map data may be map data before being updated to the one previous map data. Also, the read operation controller 220 may acquire a physical address mapped to the target logical address from the different previous map data. The read operation controller 220 may repeatedly perform an operation of detecting the different previous map data and an operation of acquiring the physical address mapped to the target logical address until the second physical address is acquired through an operation of acquiring the physical address mapped to the target logical address. In other words, the read operation controller 220 can check the different previous map data until a previous map data is found to have a physical address that is different than the first physical address and mapped to the same target logical address as the first physical address. In some embodiments, the previous map data are checked in order from the most-recent previous map data to the oldest previous map data, and the process can continue until all available previous map data has been checked, or after a certain number of iterations.

In an embodiment, when the first physical address and the physical address acquired from the one previous map data are different from each other, the read operation controller 220 determine the physical address acquired from the one previous map data as the second physical address. The read operation controller 220 may control the memory device 100 to read data stored at the second physical address. The memory device 100 may read the data stored at the second physical address and provide the read data to the memory controller 200.

In an embodiment, the error corrector 230 may correct an error of the data stored at the second physical address. When the error of the data stored at the second physical address is an uncorrectable error, the read operation controller 220 may provide the host 300 with the data stored at the first physical address and information representing occurrence of the uncorrectable error. That is, when the error of the data stored at the second physical address is an uncorrectable error, the host 300 cannot perform data recovery by using the data stored at the second physical address, and hence the read operation controller 220 may provide the host 300 with the data stored at the first physical address as it is. Alternatively, when an error correction operation of the data stored at the second physical address is able to correct the error at the second physical address, the read operation controller 220 may provide the host 300 with the data stored at the second physical address and information representing occurrence of the uncorrectable error at the first physical address.

In addition, when the data stored at the second physical address is erase data, the read operation controller 220 may provide the host 300 with the data stored at the first physical address and information representing occurrence of the uncorrectable error. That is, when the data stored at the second physical address is erase data, any data to be provided in substitution for the data stored at the first physical address does not exist in the storage device 50, and hence the read operation controller 220 may provide the host 300 with the data stored at the first physical address as it is.

Meanwhile, the map data storage 210 may read the data stored at the second physical address, remove one or more previous system data which have been stored, and then receive and store system data from the memory device 100.

In an embodiment, the error corrector 230 may correct errors of the one previous system data and the one previous map data. When an error of at least one of the one previous system data and the one previous map data is an uncorrectable error, the read operation controller 230 may provide the host 300 with information representing data stored in a page having the first physical address and information representing occurrence of the uncorrectable error. That is, when an error of the one previous system data or the one previous map data is an uncorrectable error, the second physical address cannot be acquired, and hence the read operation controller 220 may provide the host 300 with the data stored at the first physical address as it is.

Also, when at least one of the one previous system data and the one previous map data is erase data, the read operation controller 220 may provide the host 300 with data stored in a page having the first physical address and information representing occurrence of the uncorrectable error. That is, when the one previous system data or the one previous map data is erase data, the second physical address cannot be acquired, and hence the read operation controller 220 may provide the host 300 with the data stored at the first physical address as it is.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In an embodiment, the host 300 may include a recovery manager 310.

When information representing occurrence of an uncorrectable error is received from the memory controller 200, the recovery manager 310 may recover data corresponding to the target logical address. An operation of recovering data may be an operation of re-generating the corresponding data such that no error exists in that data. For example, the recovery manager 310 may recover the data corresponding to the target logical address, based on the data stored at the second physical address received from the memory controller 200.

In an embodiment, the data stored at the second physical address may include header information, master boot record information, and the like. The header information may include information representing contents and features of the corresponding data. For example, the header information may include a data type of the corresponding data, time data, address data, and the like. The master boot record information may include a first sector of the memory device 100 which is partitioned. For example, the master boot record information may include information on how the partition of a corresponding memory device 100 including a file system is organized, a boot loader as an execution code for loading an installed operating system, and the like.

In an embodiment, the recovery manager 310 may detect at least one of the header information and the master boot record information from the data stored at the second physical address. The recovery manager 310 may recover the data corresponding to the target logical address by using the detected the header information and/or the master boot record information.

The host 300 may perform an operation that would normally be performed through the data corresponding to the target logical address by using the recovered data.

Figure 2:
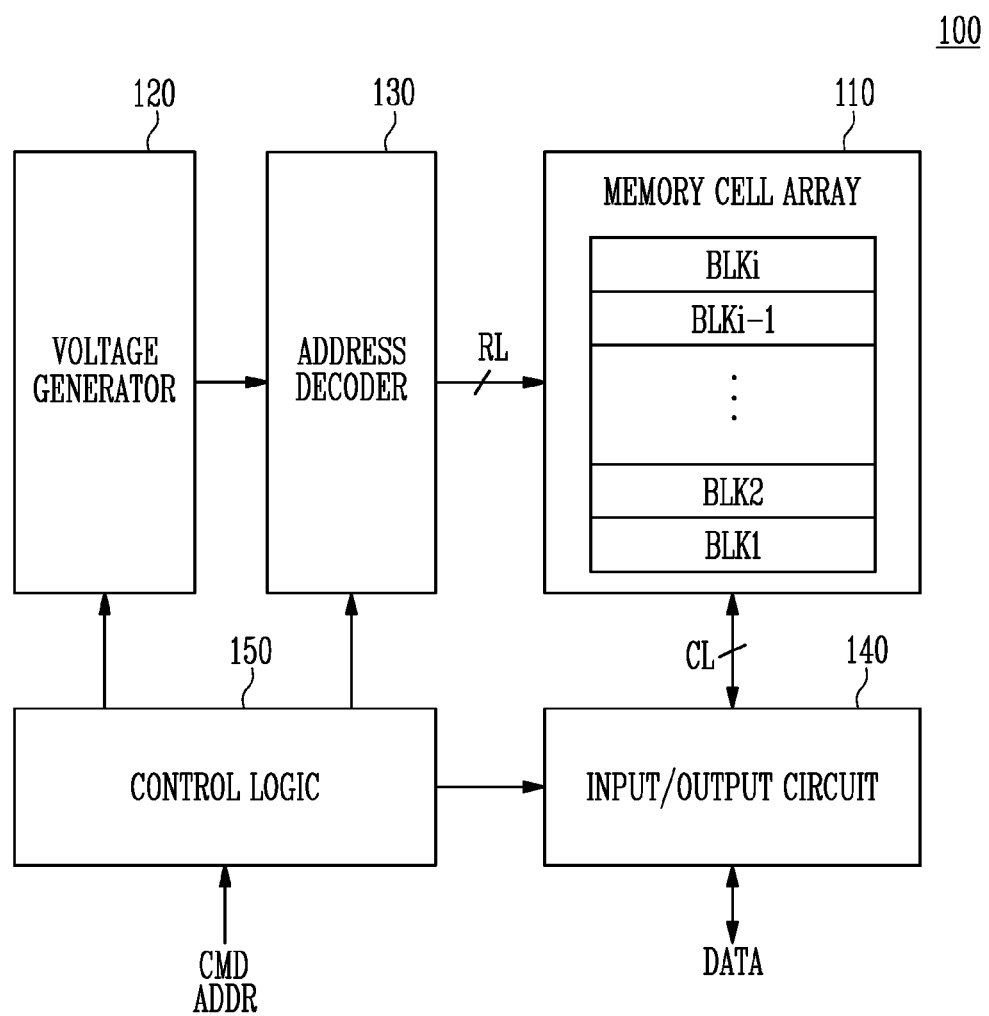
FIG. 2 is a diagram illustrating a memory device shown in FIG. 1.

FIG. 2 is a diagram illustrating the memory device shown in FIG. 1.

Referring to FIG. 2, the memory device 100 may include a memory cell array 110, a voltage generator 120, an address decoder 130, an input/output circuit 140, and a control logic 150.

The memory cell array 110 may include a plurality of memory blocks BLK1 to BLKi. The plurality of memory blocks BLK1 to BLKi may be connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

Some of the plurality of memory blocks BLK1 to BLKi may be map data blocks storing the map data described with reference to FIG. 1. The other of the plurality of memory blocks BLK1 to BLKi may be normal blocks storing data which the host 300 requests.

In an embodiment, the voltage generator 120, the address decoder 130, and the input/output circuit 140 may be commonly designated as a peripheral circuit. The peripheral circuit may drive the memory cell array 110 under the control of the control logic 150. The peripheral circuit may drive the memory cell array 110 to perform a program operation, a read operation, and an erase operation.

The voltage generator 120 may generate a plurality of operating voltages by using an external power voltage supplied to the memory device 100. The voltage generator 120 may operate under the control of the control logic 150.

In an embodiment, the voltage generator 120 may generate an internal power voltage by regulating the external power voltage. The internal power voltage generated by the voltage generator 120 may be used as an operating voltage of the memory device 100.

In an embodiment, the voltage generator 120 may generate a plurality of operating voltages by using the external power voltage or the internal power voltage. The voltage generator 120 may generate various voltages required in the memory device 100. For example, the voltage generator 120 may generate a plurality of erase voltages, a plurality of program voltages, a plurality of pass voltages, a plurality of select read voltages, and a plurality of unselect read voltages.

In order to generate a plurality of operating voltages having various voltage levels, the voltage generator 120 may include a plurality of pumping capacitors which receive the internal power voltage. The voltage generator 120 may generate the plurality of operating voltages by selectively activating the plurality of pumping capacitors under the control of the control logic 150.

The plurality of operating voltages generated by the voltage generator 120 may be supplied to the memory cell array 110 by the address decoder 130.

The address decoder 130 may be connected to the memory cell array 110 through the row lines RL. The address decoder 130 may operate under the control of the control logic 150. The address decoder 130 may receive an address ADDR from the control logic 150. The address decoder 130 may decode a block address in the received address ADDR. The address decoder 130 may select at least one memory block among the memory blocks BLK1 to BLKi according to the decoded block address. The address decoder 130 may decode a row address in the received address ADDR. The address decoder 130 may select at least one word line among word lines of the selected memory block according to the decoded row address. In an embodiment, the address decoder 130 may decode a column address in the received address ADDR. The address decoder 130 may connect the input/output circuit 140 and the memory cell array 110 to each other according to the decoded column address.

In accordance with an embodiment of the present disclosure, in a read operation, the address decoder 130 may apply a read voltage to the selected word line, and apply a read pass voltage having a level higher than that of the read voltage to unselected word lines.

Exemplarily, the address decoder 130 may include components such as a row decoder, a column decoder, and an address decoder.

The input/output circuit 140 may include a plurality of page buffers. The plurality of page buffers may be connected to the memory cell array 110 through the bit lines. In a program operation, data stored in the plurality of page buffer may be provided to a selected physical page through the bit lines, and the provided data may be stored in memory cells included in the selected physical page. In a read operation, data stored in the memory cells included in the selected physical page may be sensed through the bit lines, and the sensed data may be stored in the page buffers.

The control logic 150 may control the address decoder 130, the voltage generator 120, and the input/output circuit 140. The control logic 150 may operate in response to a command CMD transferred from an external device. The control logic 150 may control the peripheral circuit by generating control signals in response to the command CMD and the address ADDR.

Figure 3:
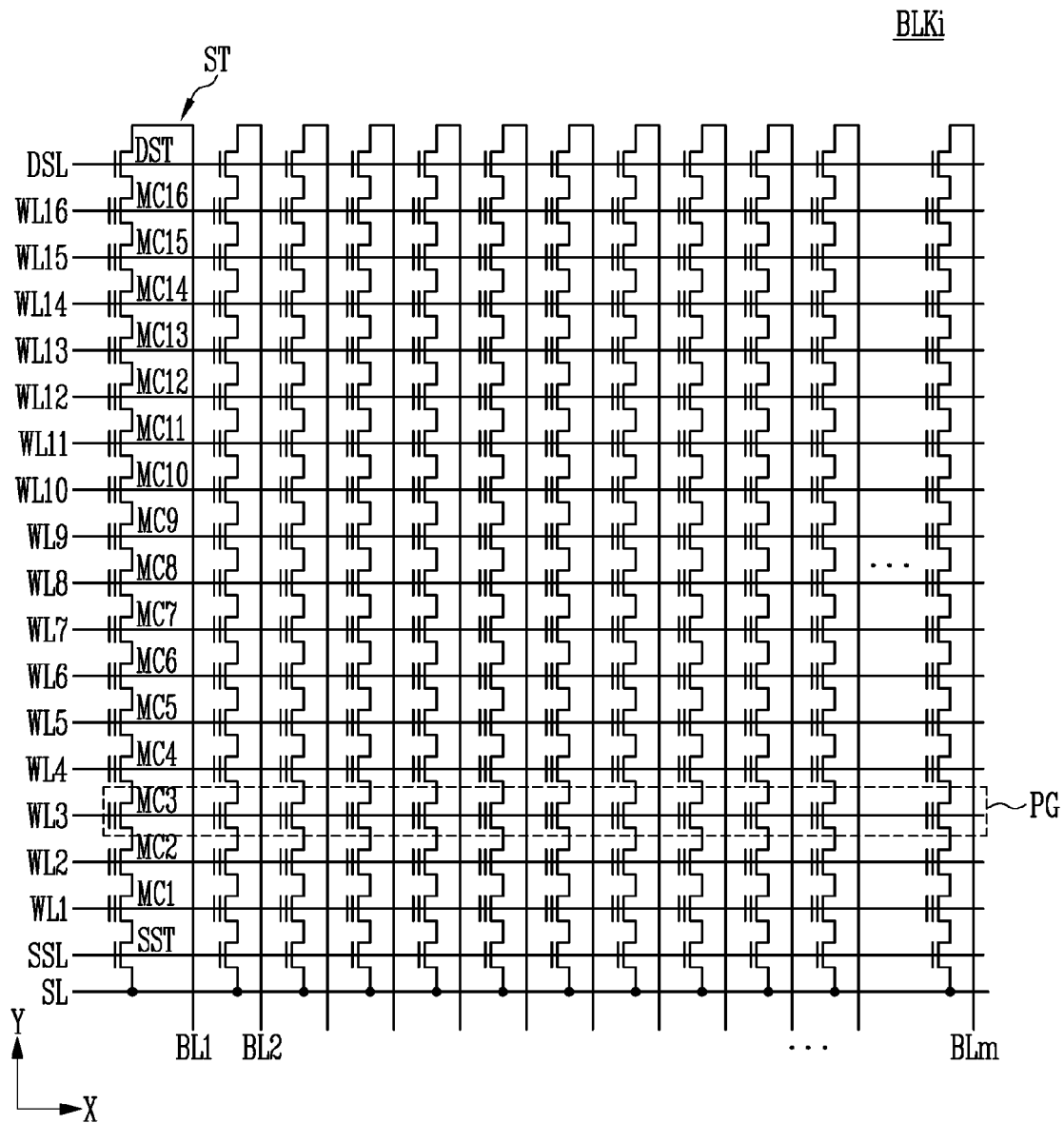
FIG. 3 is a diagram illustrating a structure of any one memory block among memory blocks shown in FIG. 2.

FIG. 3 is a diagram illustrating a structure of any one memory block among the memory blocks shown in FIG. 2.

A memory block BLKi represents any one memory block BLKi among the memory blocks BLK1 to BLKi shown in FIG. 2.

Referring to FIG. 3, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLm and a source line SL. The bit lines BL1 to BLm may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells MC1 to MC16, and a drain select transistor DST, which are connected in series to each other between the source line SL and the first bit line BL1. At least one drain select transistor DST may be included in one string ST, and source select transistors of which a number is greater than that of the source select transistor SST shown in the drawing and memory cells of which a number is greater than that of the memory cells MC1 to MC16 shown in the drawing may be included in the one string ST.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells MC1 to MC16 may be connected to a plurality of word lines WL1 to WL16. A group of memory cells connected to the same word line among memory cells included in different strings ST may be referred to as a physical page PG. Therefore, physical pages PG corresponding to the number of the word lines WL1 to WL16 may be included in the memory block BLKi.

One memory cell may store one-bit data. In such implementations, the one memory cell is generally referred to as a single level cell (SLC). One physical page PG may store one logical page (LPG) data. One LPG data may include data bits corresponding to the number of cells included in the one physical page PG.

In some implementations, one memory cell may store two or more-bit data. In such implementations, one physical page PG may store two or more LPG data.

Figure 4:
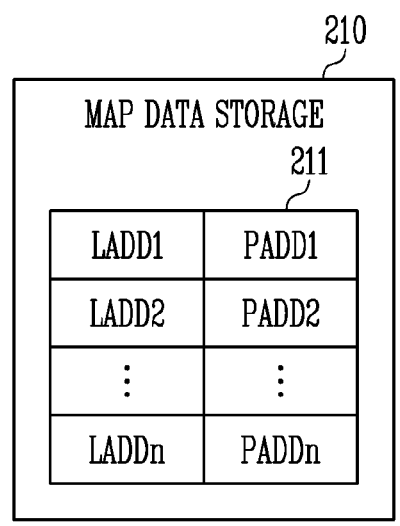
FIG. 4 is a diagram illustrating map data in accordance with an embodiment of the present disclosure.

FIG. 4 is a diagram illustrating map data in accordance with an embodiment of the present disclosure.

Referring to FIG. 4, the map data storage 210 may store map data 211. Also, the map data storage 210 may store system data, and the system data may include the map data 211.

The map data 211 may include mapping information between a plurality of logical addresses LADD and a plurality of physical addresses PADD.

For example, logical address 1 LADD1 may have a relationship in which the logical address 1 LADD1 is mapped with physical address 1 PADD1. In addition, logical address 2 LADD2 may have a relationship in which the logical address 2 LADD2 is mapped with physical address 2 PADD2. In addition, logical address n LADDn may have a relationship in which the logical address n LADDn is mapped with physical address n PADDn.

The read operation controller 220 may convert a target logical address received from the host 300 into a corresponding physical address by using the map data 211 stored in the map data storage 210. For example, when the logical address 1 LADD1 corresponding to a read request is received from the host 300, the read operation controller 220 may acquire the physical address 1 PADD1 mapped to the logical address 1 LADD1 by using the map data 211. In addition, when the logical address 2 LADD2 corresponding to a read request is received from the host 300, the read operation controller 220 may acquire the physical address 2 PADD2 mapped to the logical address 2 LADD2 by using the map data 211. In addition, when the logical address n LADDn corresponding to a read request is received from the host 300, the read operation controller 220 may acquire the physical address n PADDn mapped to the logical address n LADDn by using the map data 211.

Figure 5:
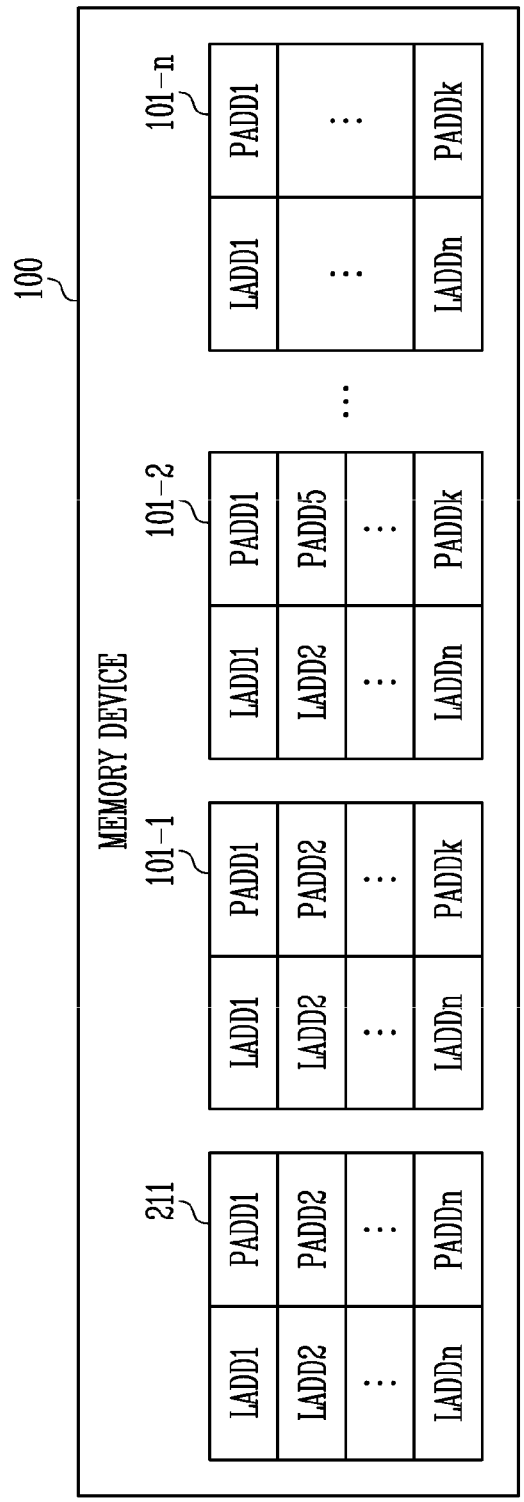
FIG. 5 is a diagram illustrating previous map data in accordance with an embodiment of the present disclosure.

FIG. 5 is a diagram illustrating previous map data in accordance with an embodiment of the present disclosure.

Referring to FIG. 5, the memory device 100 may include map data 211 and a plurality of previous map data 101-1 to 101-n.

The plurality of previous map data 101-1 to 101-n may be map data stored in the memory device 100 before the map data 211 is generated. That is, the plurality of previous map data 101-1 to 101-n may be map data before being updated to the map data 211. For example, when operations such as a write operation according to a write request of the host 300, read reclaim, or garbage collection is performed, a mapping relationship between a logical address and a physical address may be changed. Therefore, the plurality of previous map data 101-1 to 101-n may be map data which are updated and generated whenever the mapping relationship between the logical address and the physical address is changed. For example, previous map data having the smallest number among the plurality of previous map data 101-1 to 101-n may be most recently updated map data.

In an embodiment, nth previous map data 101-n may be the oldest map data among the plurality of previous map data 101-1 to 101-n. The nth previous map data 101-n may not include, for example, mapping information on logical address 2 LADD2 because a write request to logical address 2 LADD2 has not yet occurred at that time.

Subsequently, the memory controller 200 may receive logical address 2 LADD2 corresponding to a write request, and map the logical address 2 LADD2 to physical address 5 PADD5. The memory device 100 may store write data at the physical address 5 LADD5 according to a write command. Also, the memory controller 200 may update the nth previous map data 101-n to reflect a changed mapping relationship. For example, second previous map data 101-2 generated according to the update may include mapping information of the logical address 2 LADD2 and the physical address 5 PADD5.

Subsequently, the memory controller 200 may perform a garbage collection operation. Accordingly, the physical address mapped to the logical address n LADDn may be changed from physical address k LADDk to the physical address n PADDn. The memory controller 200 may update a first previous map data 101-1 to reflect the changed mapping relationship. The map data 211 generated according to the update may include mapping information between the logical address n LADDn and the physical address n PADDn.

In addition, the memory device 100 may include system data and a plurality of previous system data. The plurality of previous system data may be system data stored in the memory device 100 before currently used system data is generated. That is, the plurality of previous system data may be system data before being updated to the currently used system data. For example, when operations such as a write operation according to a write request of the host 300, read reclaim, or garbage collection is performed, a mapping relationship between a logical address and a physical address may be changed. Therefore, the plurality of previous system data may be system data which are updated and generated whenever the mapping relationship between the logical address and the physical address is changed. The plurality of previous system data may include a plurality of previous map data 101-1 to 101-n.

Figure 6B:
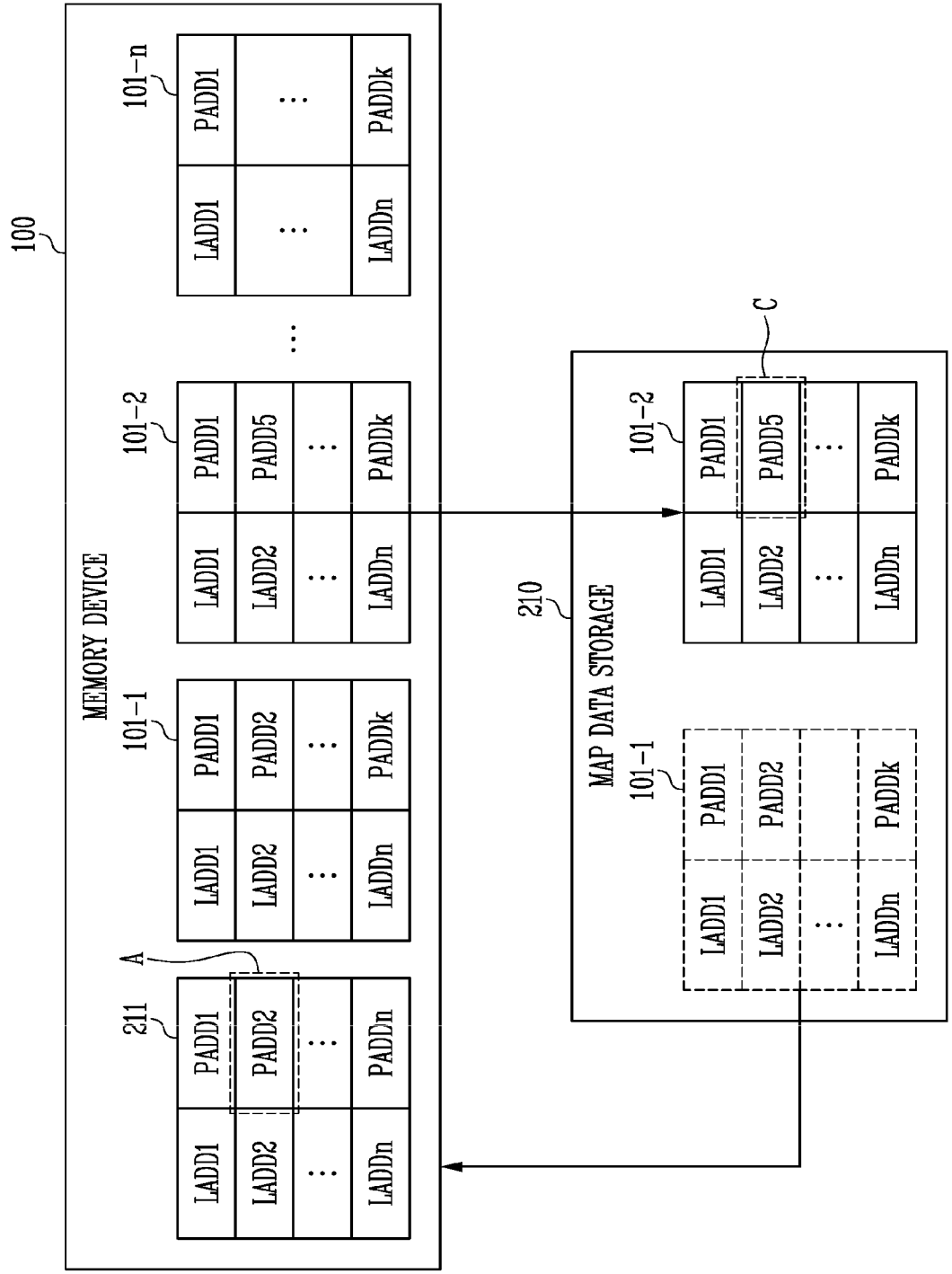

FIGS. 6A and 6B are diagrams illustrating an operation of acquiring a second physical address in accordance with an embodiment of the present disclosure.

Referring to FIG. 6A, the read operation controller 220 may receive logical address 2 LADD2 corresponding to a read request, and control the memory device 100 to perform a read operation on physical address 2 PADD2 mapped to the logical address 2 LADD2.

When an error of data stored in the physical address 2 PADD2 is an uncorrectable error, the map data storage 210 may remove map data 211, and receive and store first previous map data 101-1 from the memory device 100. The read operation controller 220 may acquire the physical address 2 PADD2 mapped to the logical address 2 LADD2, based on the first previous map data 101-1. Since physical address A acquired from the map data 211 and physical address B acquired from the first previous map data 101-1 are the same, the read operation controller 220 may again acquire a physical address by using previous map data different from the first previous map data 101-1.

Referring to FIG. 6B, the map data storage 210 may remove the first previous map data 101-1, and receive and store second previous map data 101-2 from the memory device 100. The read operation controller 220 may acquire physical address 5 PADD5 mapped to the logical address 2 LADD2, based on the second previous map data 101-2. Since the physical address A acquired from the map data 211 and physical address C acquired from the second previous map data 101-2 are different from each other, the read operation controller 220 may generate a read command for the physical address 5 PADD5 and provide the generated read command to the memory device 100. The memory device 100 may read data stored at the physical address 5 PADD5 according to the read command and provide the read data to the read operation controller 220.

Figure 7A:
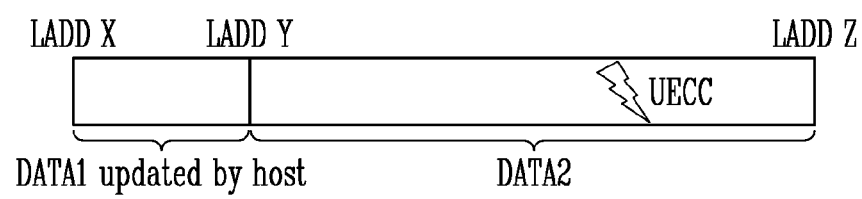
FIGS. 7A and 7B are diagrams illustrating a recovery operation of a host in accordance with an embodiment of the present disclosure.
Figure 7B:
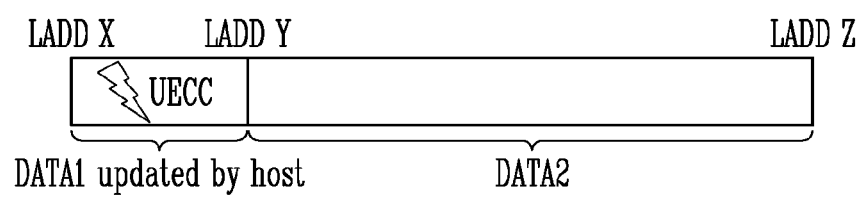

FIGS. 7A and 7B are diagrams illustrating a recovery operation of the host in accordance with an embodiment of the present disclosure.

In an embodiment, drawings shown in FIGS. 7A and 7B illustrate data corresponding to a logical address of the host 300.

Referring to FIG. 7A, first data DATA1 from logical address X LADD X to logical address Y LADD Y may be data updated by the host 300. For example, the first data DATA1 may be data which is changed and stored in the storage device 50 according to a request of the host 300. Second data DATA2 from the logical address Y LADD Y to logical address Z LADD Z may be data which is not updated by the host 300. For example, the second data DATA2 may be data stored according to an internal operation of the storage device 50 regardless of the request of the host 300.

In an embodiment, the host 300 may provide the storage device 50 with a read request for requesting data corresponding to a target logical address. The data according to the target logical address may be the second data DATA2. When an uncorrectable error (i.e., UECC) occurs in data stored at a first physical address mapped to the target logical address, the host 300 may receive, from the storage device 50, data stored at a second physical address mapped to the target logical address and information representing occurrence of the uncorrectable error. The host 300 may perform an operation that is normally performed through the data corresponding to the target logical address by using the data stored at the second physical address. That is, since the second data DATA2 is data which is not changed by the host 300, the host 300 may perform a normal operation by using old data as it is.

Referring to FIG. 7B, in an embodiment, the host 300 may provide the storage device 50 with a read request for requesting data corresponding to a target logical address. The data corresponding to the target logical address may be first data DATA1. When an uncorrectable error (i.e., UECC) occurs in data stored at a first physical address mapped to the target logical address, the host 300 may receive, from the storage device 50, data stored at a second physical address mapped to the target logical address and information representing occurrence of the uncorrectable error.

In an embodiment, the host 300 may recover the data corresponding to the target logical address, based on the data stored at the second physical address, which is received from the storage device 50. The data stored at the second physical address may include at least one of header information, master boot record information, and the like. In an embodiment, the host 300 may detect at least one of the header information and the master boot record information from the data stored at the second physical address. The host 300 may recover the data corresponding to the target logical address by using the detected at least one of the header information and the master boot record information. For example, the host 300 may generate the data corresponding to the target logical address by using at least one of the data type of data included in the header information, time data, address data, and the like. Also, the host 300 may generate the data corresponding to the target logical address by using at least one of organization information of a partition included in the master boot record information, a boot loader, and the like. Subsequently, the host 300 may perform a normal operation by using the recovered data.

Meanwhile, although a method in which the host 300 recovers data by using at least one of the header information and the master boot record information has been described in the above-described embodiment, the present is not necessarily limited thereto, and the data may be recovered by using various information included in the data stored at the second physical address.

Figure 8:
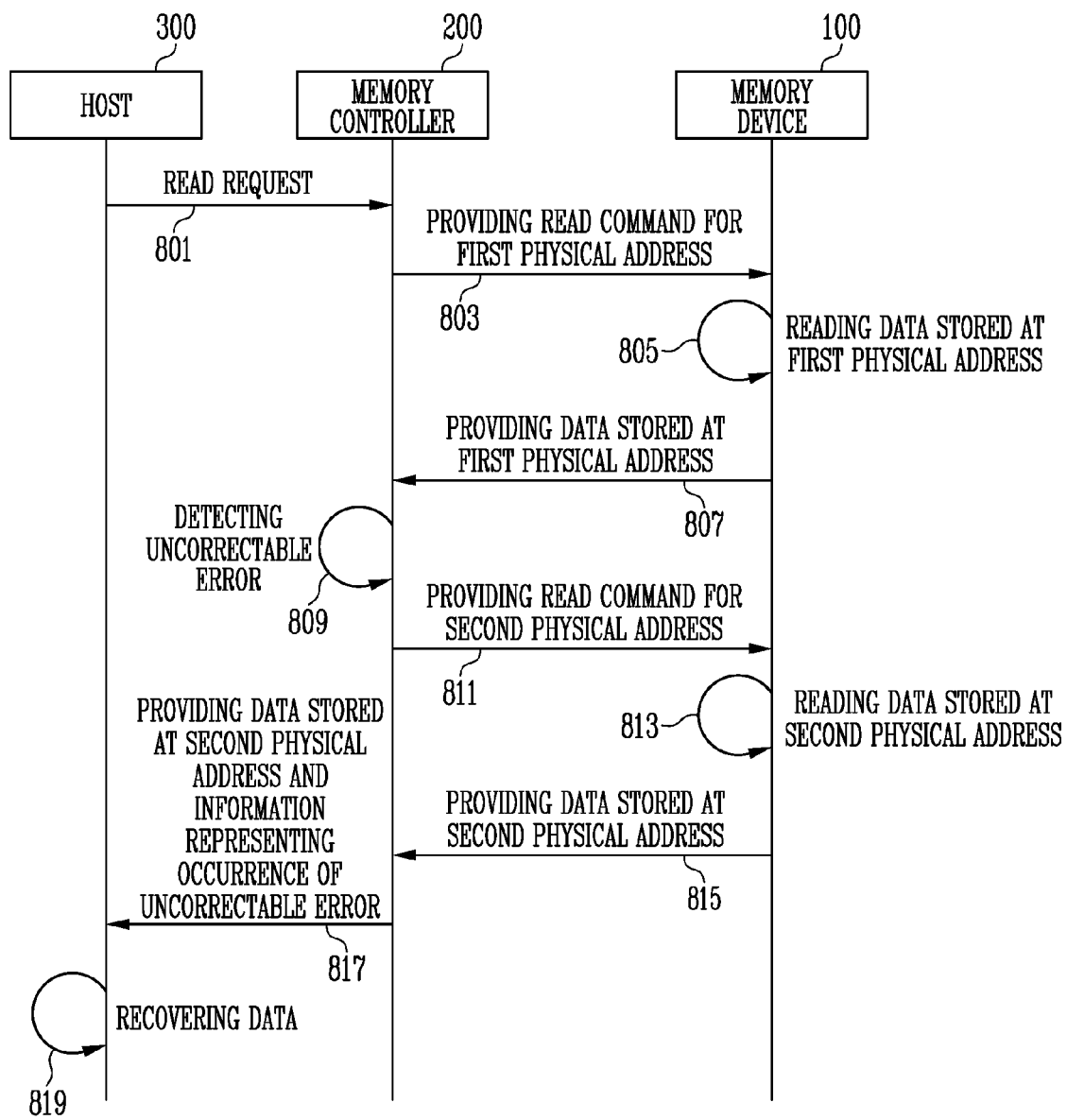
FIG. 8 is a flowchart illustrating a read operation of the computing system in accordance with an embodiment of the present disclosure.

FIG. 8 is a flowchart illustrating a read operation of the computing system in accordance with an embodiment of the present disclosure.

In an embodiment, FIG. 8 is a diagram illustrating a read operation of the computing system, when an uncorrectable error exists in read data.

Referring to FIG. 8, the host 300 may provide a read request to the memory controller 200 (801).

Subsequently, the memory controller 200 may provide the memory device 100 with a read command for a first physical address (803). For example, the memory controller 200 may acquire the first physical address mapped to a target logical address, based on map data. Also, the memory controller 200 may generate the read command for the first physical address, and provide the memory device 100 with the first physical address and the read command.

Subsequently, the memory device 100 may read data stored at the first physical address according to the read command (805).

Subsequently, the memory device 100 may provide the memory controller 200 with the data stored at the first physical address (807).

Subsequently, the memory controller 200 may detect an uncorrectable error from the data stored at the first physical address (809).

Subsequently, the memory controller 200 may provide the memory device 100 with a read command for a second physical address (811). For example, the memory controller 200 may acquire the second physical address mapped to the target logical address, based on previous map data. Also, the memory controller 200 may generate the read command for the second physical address, and provide the memory device 100 with the second physical address and the read command.

Subsequently, the memory device 100 may read data stored at the second physical address according to the read command (813).

Subsequently, the memory device 100 may provide the memory controller 200 with the data stored at the second physical address (815).

Subsequently, the memory controller 200 may provide the host 300 with the data stored at the second physical address and information representing occurrence of an uncorrectable error (817).

Subsequently, the host 300 may recover data corresponding to the target logical address, based on the data stored at the second physical address (819).

Figure 9:
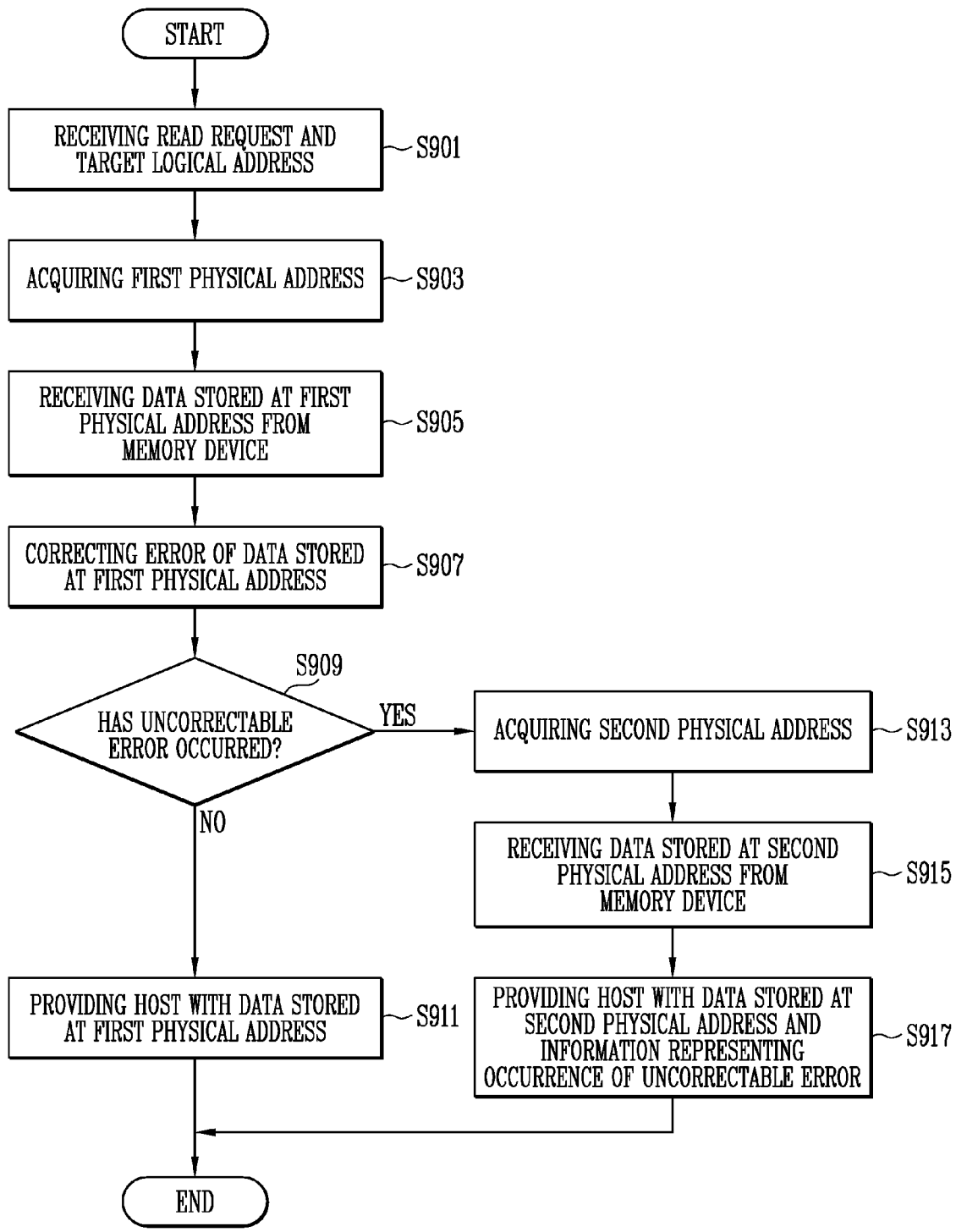
FIG. 9 is a flowchart illustrating an operating method of a memory controller in accordance with an embodiment of the present disclosure.

FIG. 9 is a flowchart illustrating an operating method of a memory controller in accordance with an embodiment of the present disclosure.

The operating method shown in FIG. 9 may be performed by, for example, the memory controller 200 shown in FIG. 1.

Referring to FIG. 9, in step S901, the memory controller 200 may receive, from the host 300, a read request and a target logical address corresponding to the read request.

In step S903, the memory controller 200 may acquire a first physical address mapped to the target logical address. For example, the memory controller 200 may acquire the first physical address, based on map data.

In step S905, the memory controller 200 may receive data stored at the first physical address from the memory device 100.

In step S907, the memory controller 200 may perform an optional step of correcting an error of the data stored at the first physical address if a correctable error is present in the data stored at the first physical address.

In step S909, the memory controller 200 may determine whether an uncorrectable error has occurred in the data stored at the first physical address. When the uncorrectable error does not occur, the memory controller 200 may perform step S911. In the step S911, the memory controller 200 may provide the host 300 with the data stored at the first physical address.

Alternatively, the memory controller 200 may detect an uncorrectable error from the data stored at the first physical address. The memory controller 200 may perform step S913. In the step S913, the memory controller 200 may acquire a second physical address mapped to the target logical address before the first physical address is mapped. For example, the memory controller 200 may acquire the second physical address, based on one or more previous map data stored in the memory device 100 before the map data is generated.

In step S915, the memory controller 200 may receive data stored at the second physical address from the memory device 100.

In step S917, the memory controller 200 may provide the host 300 with the data stored at the second physical address and information representing occurrence of the uncorrectable error.

Figure 10:
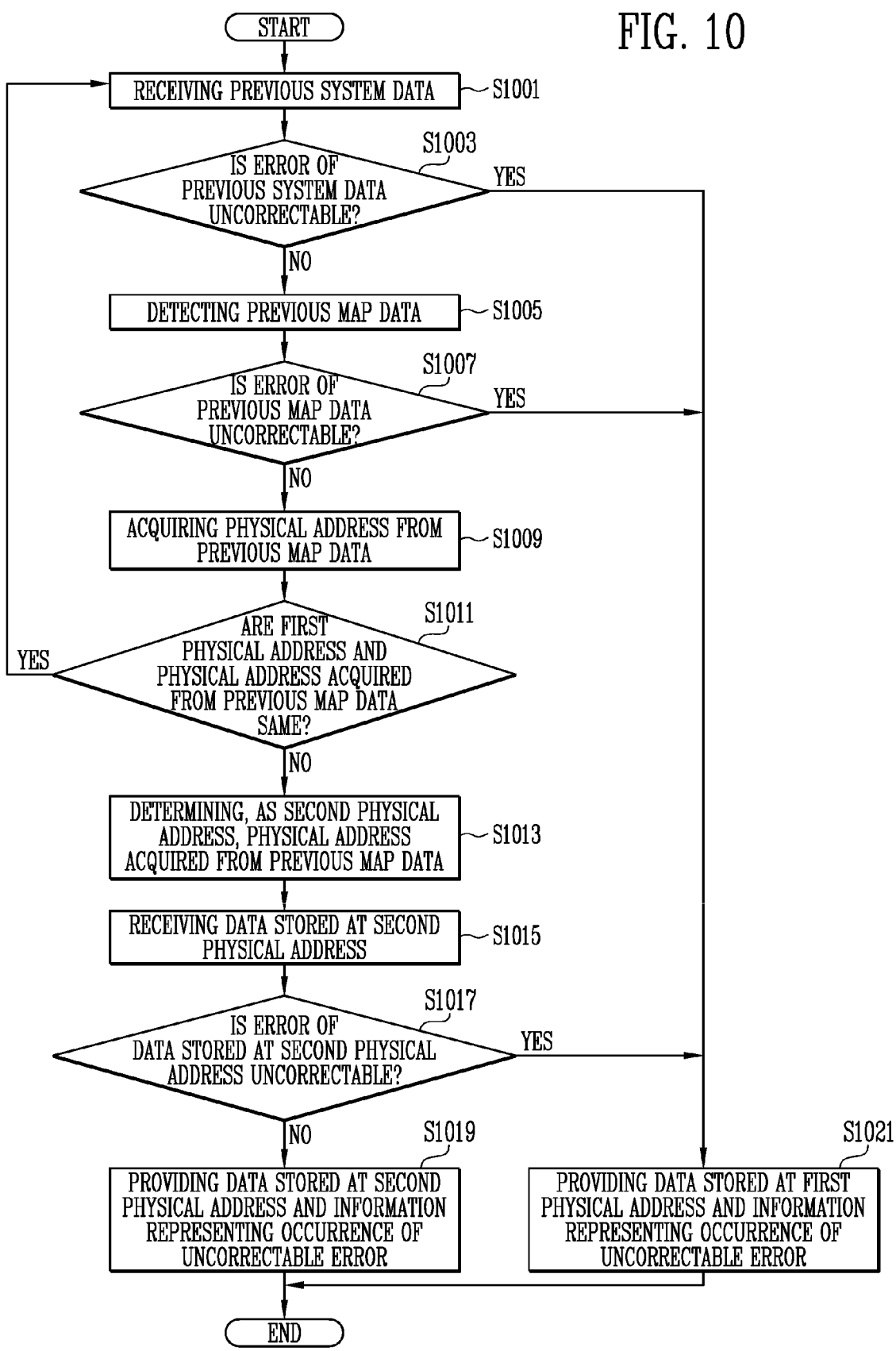
FIG. 10 is a flowchart illustrating an operating method of the memory controller when an error correction operation fails in accordance with an embodiment of the present disclosure.

FIG. 10 is a flowchart illustrating an operating method of the memory controller when an error correction operation fails in accordance with an embodiment of the present disclosure.

The operating method shown in FIG. 10 may be performed by, for example, the memory controller 200 shown in FIG. 1.

Referring to FIG. 10, in step S1001, the memory controller 200 may receive, from the memory device 100, previous system data before being updated to currently used system data.

In step S1003, the memory controller 200 may determine whether an error of the previous system data is an uncorrectable error. For example, the memory controller 200 may attempt to correct the error of the previous system data. When the error of the previous system data is the uncorrectable error, the memory controller 200 may perform step S1021. Also, in some embodiments, when the previous system data is erase data, the memory controller 200 may perform the step S1021. Alternatively, when the error of the previous system data is not the uncorrectable error, the memory controller 200 may perform step S1005. Also, in some embodiments, when the previous system data is not the erase data, the memory controller 200 may perform the step S1005.

In the step S1005, the memory controller 200 may detect, from the previous system data, previous map data before being updated to currently used map data.

In step S1007, the memory controller 200 may determine whether an error of the previous map data is an uncorrectable error. For example, the memory controller 200 may attempt to correct the error of the previous map data. When the error of the previous map data is the uncorrectable error, the memory controller 200 may perform the step S1021. Also, in some embodiments, when the previous map data is erase data, the memory controller 200 may perform the step S1021. Alternatively, when the error of the previous map data is not the uncorrectable error, the memory controller 200 may perform step S1009. Also, in some embodiments, when the previous map data is not the erase data, the memory controller 200 may perform the step S1009.

In the step S1009, the memory controller 200 may acquire a physical address mapped to a target logical address from the previous map data.

In step S1011, the memory controller 200 may determine whether a first physical address and the physical address acquired from the previous map data are the same. When the first physical address and the physical address acquired from the previous map data are the same, the memory controller 200 may again perform the step S1001. The memory controller 200 may receive previous system data different from the previous system data from the memory device 100. The different previous system data may be system data before being updated to the previous system data of the prior iteration of step S1001. Alternatively, when the first physical address and the physical address acquired from the previous map data are different from each other, the memory controller 200 may perform step S1013. That is, the memory controller 200 may repeatedly performed the steps S1001 to S1011, until a second physical address is acquired.

In the step S1013, the memory controller 200 may determine, as the second physical address, the physical address acquired from the previous map data.

In step S1015, the memory controller 200 may receive data stored at the second physical address from the memory device 100. For example, the memory controller 200 may provide the memory device 100 with the second physical address and the a read command corresponding to the second physical address, and receive the data stored at the second physical address from the memory device 100 in response to the read command.

In step S1017, the memory controller 200 may determine whether an error of the data stored at the second physical address is an uncorrectable error. For example, the memory controller 200 may correct the error of the data stored at the second physical address. When the error of the data stored at the second physical address is the uncorrectable error, the memory controller 200 may perform the step S1021. Also, in some embodiments, when the data stored at the second physical address is erase data, the memory controller 200 may perform the step S1021. Alternatively, when the error of the data stored at the second physical address is not the uncorrectable error, the memory controller 200 may perform step S1019. Also, in some embodiments, when the data stored at the second physical address is not the erase data, the memory controller 200 may perform the step S1019.

In the step S1019, the memory controller 200 may provide the host 300 with the data stored at the second physical address and information representing occurrence of the uncorrectable error.

In the step S1021, the memory controller 200 may provide the host 300 with data stored at the first physical address and information representing occurrence of the uncorrectable error.

Figure 11:
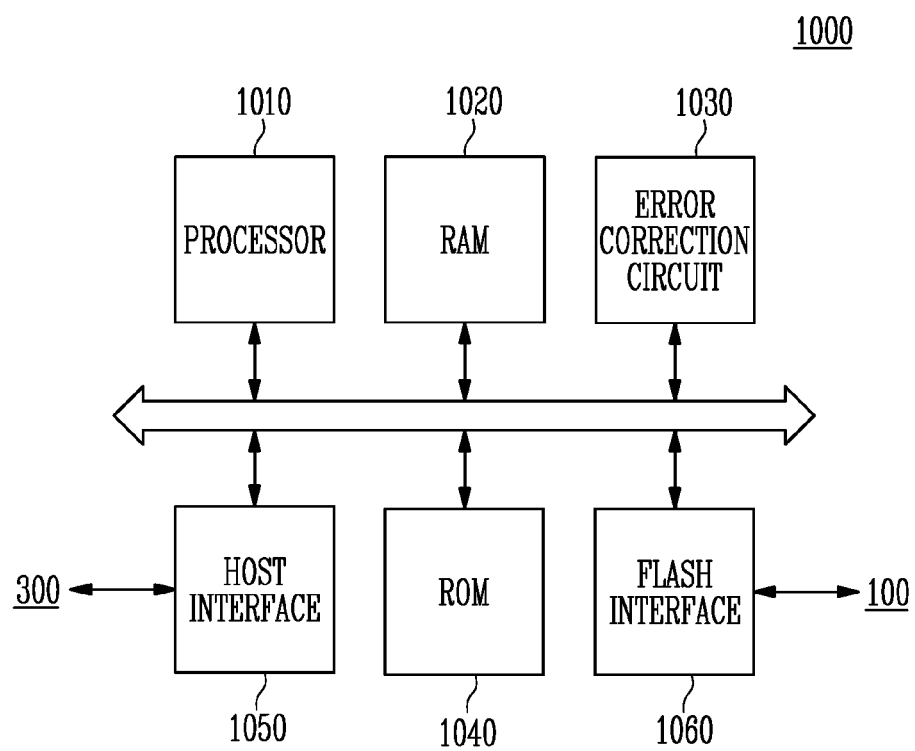
FIG. 11 is a diagram illustrating a memory controller in accordance with an embodiment of the present disclosure.

FIG. 11 is a diagram illustrating a memory controller in accordance with an embodiment of the present disclosure.

The memory controller 1000 shown in FIG. 11 may represent the memory controller 200 shown in FIG. 1.

Referring to FIGS. 1 and 11, the memory controller 1000 may include a processor 1010, a RAM 1020, an error correction circuit 1030, ROM 1040, a host interface 1050, and a flash interface 1060.

The processor 1010 may control overall operations of the memory controller 1000. In an embodiment, the read operation controller 220 shown in FIG. 1 may be implemented as one component of the processor 1010.

The RAM 1020 may be used as a buffer memory, a cache memory, a working memory, etc. of the memory controller 1000. In an embodiment, the map data storage 210 shown in FIG. 1 may be implemented as one component of the RAM 1020.

The error correction circuit 1030 may perform error correction. The error correction circuit 1030 may perform error correction code (ECC) encoding on data to be written to the memory device through the flash interface 1060. The ECC-encoded data may be transferred to the memory device through the flash interface 1060. The error correction circuit 1030 may perform ECC decoding on data received from the memory device through the flash interface 1060. Exemplarily, the error correction circuit 1030 may be included as a component of the flash interface 1060 in the flash interface 1060. The error corrector 230 shown in FIG. 1 may be implemented as one component of the error correction circuit 1030.

The ROM 1040 may store, in the form of firmware, various information required in an operation of the memory controller 1000.

The memory controller 1000 may communicate with an external device (e.g., the host 300, an application processor, or the like) through the host interface 1050.

The memory controller 1000 may communicate with the memory device 100 through the flash interface 1060. The memory controller 1000 may transmit a command, an address, a control signal, and the like to the memory device 100 through the flash interface 1060, and receive data DATA. Exemplarily, the flash interface 1060 may include a NAND interface.

Figure 12:
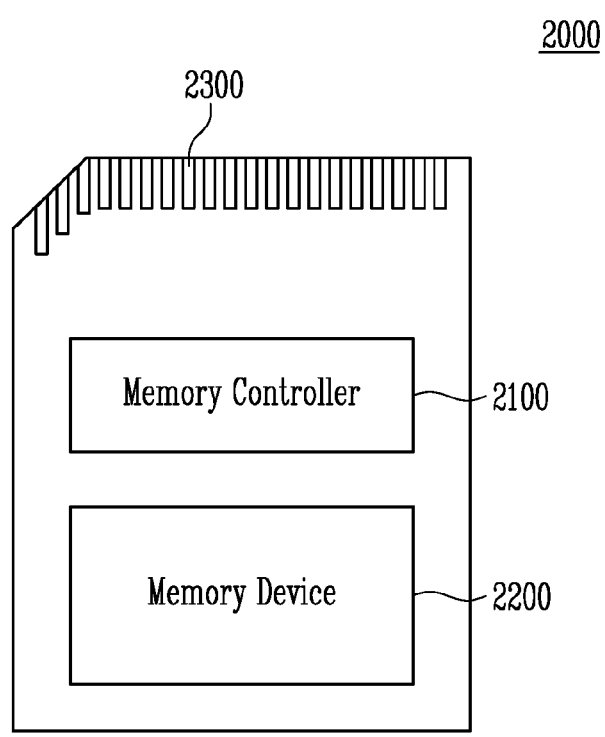
FIG. 12 is a block diagram illustrating a memory card system to which a storage device in accordance with an embodiment of the present disclosure is applied.

FIG. 12 is a block diagram illustrating a memory card system to which the storage device in accordance with an embodiment of the present disclosure is applied.

Referring to FIG. 12, the memory card system 2000 includes a memory controller 2100, a memory device 2200, and a connector 2300.

The memory controller 2100 is connected to the memory device 2200. The memory controller 2100 may access the memory device 2200. For example, the memory controller 2100 may control read, write, erase, and background operations of the memory device 2200. The memory controller 2100 provides an interface between the memory device 2200 and a host. The memory controller 2100 drives firmware for controlling the memory device 2200. The memory controller 2100 may be implemented identically to the memory controller 200 described with reference to FIG. 1. The memory device 2200 may be implemented identically to the memory device 100 described with reference to FIG. 1.

Exemplarily, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. Exemplarily, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and/or NVMe. Exemplarily, the connector 2300 may be defined by at least one of the above-described various communication protocols.

Exemplarily, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 13:
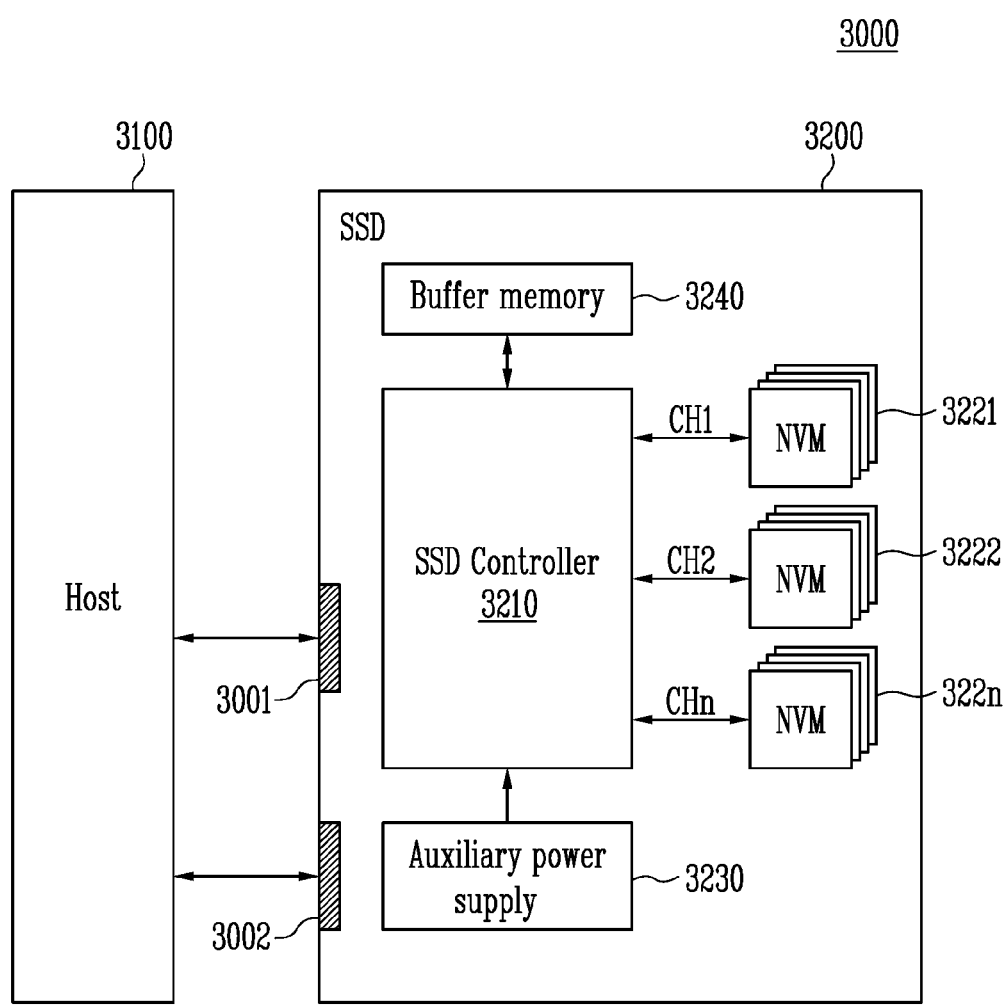
FIG. 13 is a block diagram illustrating a Solid State Drive (SSD) system to which the storage device in accordance with an embodiment of the present disclosure is applied.

FIG. 13 is a block diagram illustrating a Solid State Drive (SSD) system to which the storage device in accordance with an embodiment of the present disclosure is applied.

Referring to FIG. 13, the SSD system 3000 includes a host 3100 and an SSD 3200. The SSD 3200 exchanges a signal with the host 3100 through a signal connector 3001, and receives power through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal received from the host 3100. Exemplarily, the signal may be a signal based on an interface between the host 3100 and the SSD 3200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. The auxiliary power supply 3230 may receive the power PWR input from the host 3100, and charge the power PWR. When the supply of power from the host 3100 is not smooth, the auxiliary power supply 3230 may provide power of the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 14:
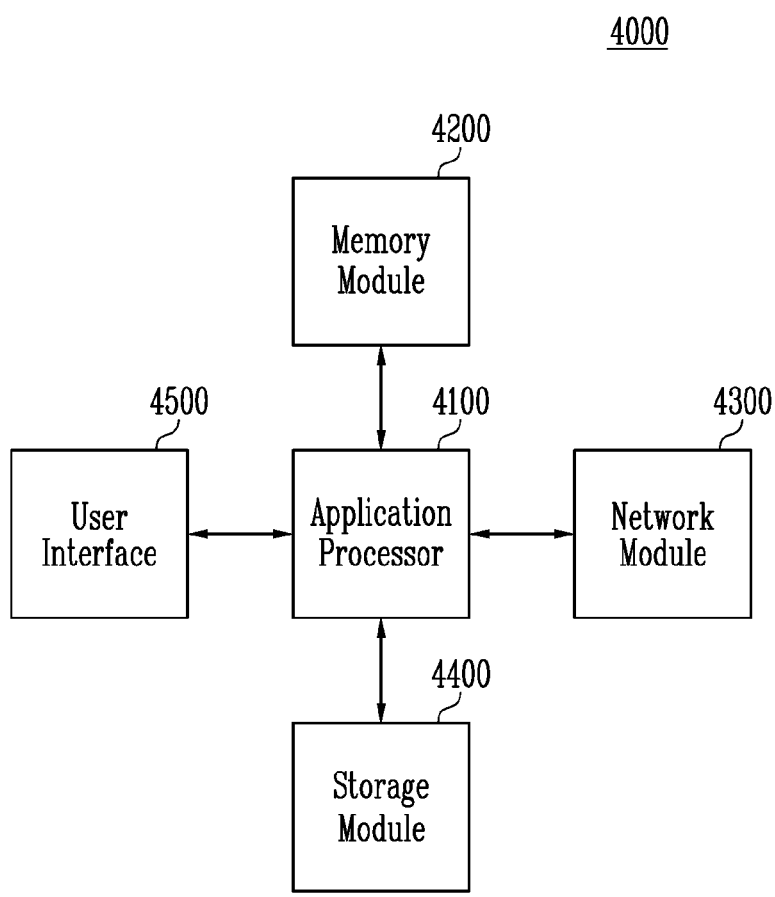
FIG. 14 is a block diagram illustrating a user system to which the storage device in accordance with an embodiment of the present disclosure is applied.

FIG. 14 is a block diagram illustrating a user system to which the storage device in accordance with an embodiment of the present disclosure is applied.

Referring to FIG. 14, the user system 4000 includes an application processor 4100, a memory module 4200, a network module 4300, a storage module 4400, and a user interface 4500.

The application processor 4100 may drive components included in the user system 4000, an operating system (OS), a user program, or the like. Exemplarily, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. Exemplarily, the application processor 4100 and the memory module 4200 may be provided as one semiconductor package by being packaged based on a Package on Package (PoP).

The network module 4300 may communicate with external devices. Exemplarily, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. Exemplarily, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 4400 may be provided as a removable drive such as a memory card of the user system 4000 or an external drive.

Exemplarily, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. Exemplarily, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a memory controller having improved performance of a read operation, an operating method thereof, and a computing system including the same.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller for controlling a read operation of a memory device, the memory controller comprising:
    a map data storage configured to store map data including mapping information between a logical address provided from a host and a physical address mapped to the logical address; and
    a read operation controller configured to receive, from the host, a read request and a target logical address corresponding to the read request, acquire a first physical address mapped to the target logical address from the map data, and obtain first data stored at the first physical address of the memory device,
    wherein, when an error of the first data is an uncorrectable error, the read operation controller is configured to acquire a second physical address previously mapped to the target logical address before the first physical address, obtain second data stored at the second physical address, and provide the host with the second data and information representing occurrence of the uncorrectable error in response to the read request.

2. The memory controller of claim 1, wherein the map data storage is configured to store system data including information used to process an operation performed with the memory device or the memory controller, and
    wherein the system data includes the map data.

3. The memory controller of claim 2, wherein, when the error of the first data is an uncorrectable error, the map data storage is configured to remove the system data, and receive and store one or more previous system data stored in the memory device, and
    wherein the one or more previous system data include one or more previous map data.

4. The memory controller of claim 3, wherein the map data storage is configured to remove the one or more previous system data after the map data storage reads the second data.

5. The memory controller of claim 3, wherein the read operation controller is configured to acquire a physical address corresponding to the target logical address from one previous map data among the one or more previous map data in one previous system data among the one or more previous system data.

6. The memory controller of claim 5, wherein the read operation controller is configured to determine the physical address acquired from the one previous map data as the second physical address when the first physical address and the physical address acquired from the one previous map data are different from each other.

7. The memory controller of claim 5, wherein the read operation controller is configured to acquire another physical address mapped to the target logical address from another previous map data in a different previous system data when the first physical address and the physical address acquired from the one previous map data are the same.

8. The memory controller of claim 7, wherein the different previous system data is system data that was used before the one previous system data.

9. The memory controller of claim 7, wherein the different previous map data is map data generated before the one previous map data.

10. The memory controller of claim 7, wherein the read operation controller is configured to repeatedly perform an operation of acquiring a physical address mapped to the target logical address from different previous map data until the second physical address is acquired.

11. The memory controller of claim 5, further comprising an error corrector configured to perform error correction on the one previous system data, the one previous map data, or the second data, and
    wherein the read operation controller is configured to provide the host with data stored in a page having the first physical address and information representing occurrence of the uncorrectable error when an error of at least one of the one previous system data, the one previous map data, or the second data is an uncorrectable error.

12. The memory controller of claim 5, wherein the read operation controller is configured to provide the host with data stored in a page having the first physical address and information representing occurrence of the uncorrectable error when at least one of the one previous system data, the one previous map data, and the second data is erase data.

13. A computing system comprising:
    a host configured to provide a read request and a target logical address corresponding to the read request; and
    a storage device configured to receive the read request and the target logical address, acquire a first physical address mapped to the target logical address from map data including mapping information between a logical address and a physical address mapped to the logical address, determine that first data stored at the first physical address of the memory device has an uncorrectable error, acquire a second physical address that was previously mapped to the target logical address before the first physical address, and provide the host with second data stored at the second physical address and information on occurrence of the uncorrectable error in response to the read request,
    wherein the host is configured to recover third data corresponding to the target logical address, based on the second data.

14. The computing system of claim 13, wherein the second data includes header information and master boot record information.

15. The computing system of claim 14, wherein the host is configured to obtain at least one of the header information and the master boot record information from the second data, and recover the third data by using at least one of the header information and the master boot record information.

16. The computing system of claim 13, wherein the storage device is configured to acquire the second physical address, based on one or more previous map data stored in the storage device before the map data for the first physical address is generated.

17. A method for operating a memory controller, the method comprising:
- receiving, from a host, a read request and a target logical address corresponding to the read request;
- acquiring a first physical address mapped to the target logical address from map data including mapping information between a logical address and a physical address mapped to the logical address;
- receiving first data stored at the first physical address from a memory device;
- detecting an uncorrectable error in the first data;
- acquiring a second physical address previously mapped to the target logical address before the first physical address;
- receiving second data stored at the second physical address from the memory device; and
- providing the host with the second data and information representing occurrence of the uncorrectable error in response to the read request.

18. The method of claim 17, wherein the second physical address is acquired based on one or more previous map data stored in the memory device before the map data for the first physical address is generated.

* * * * *